United States Patent
Plee

(10) Patent No.: US 6,264,881 B1
(45) Date of Patent: Jul. 24, 2001

(54) METHOD FOR OBTAINING LSX ZEOLITE BODIES

(75) Inventor: Dominique Plee, Lons (FR)

(73) Assignee: CECA S.A., Puteaux (FR)

( * ) Notice: Subject to any disclaimer, the term of this patent is extended or adjusted under 35 U.S.C. 154(b) by 0 days.

(21) Appl. No.: 09/269,078

(22) PCT Filed: Jul. 10, 1998

(86) PCT No.: PCT/FR98/01508

§ 371 Date: Jun. 24, 1999

§ 102(e) Date: Jun. 24, 1999

(87) PCT Pub. No.: WO99/05063

PCT Pub. Date: Feb. 4, 1999

(30) Foreign Application Priority Data

Jul. 22, 1997 (FR) .................................................. 97 09283

(51) Int. Cl.⁷ .................................................. C04B 33/32
(52) U.S. Cl. .......................... 264/628; 264/669; 264/679
(58) Field of Search ..................................... 264/628, 642, 264/669, 679

(56) References Cited

U.S. PATENT DOCUMENTS

| 3,119,660 | 1/1964 | Howell et al. |
| 3,906,076 | 9/1975 | Goytisolo et al. |
| 4,603,040 | 7/1986 | Kuznicki et al. |
| 5,993,773 | * 11/1999 | Funakoshi et al. .................. 423/709 |
| 6,036,939 | * 3/2000 | Funakoshi et al. .................. 423/710 |

FOREIGN PATENT DOCUMENTS

| 24 46 974 | 4/1975 | (DE) . |
| 299635 | 4/1992 | (DE) . |
| 196043 | 10/1986 | (EP) . |
| 4-198011 | 7/1992 | (JP) . |
| 5-163015 | 6/1993 | (JP) . |
| 6-183725 | 7/1994 | (JP) . |

OTHER PUBLICATIONS

Zeolite Molecular Sieves, D.W. Breck, John Wiley and Sons, Aug. 1979 pp. 1–28.

* cited by examiner

Primary Examiner—Christopher A. Fiorilla
(74) Attorney, Agent, or Firm—Smith, Gambrell & Russell, LLP

(57) ABSTRACT

A process for the production of faujasite X agglomerates containing at least 95% of faujasite LSX, that is to say with an Si/Al ratio equal to 1, constituting the active adsorbent. The agglomerate is formed from zeolite LSX and from a binder which can be converted to zeolite, the conversion of which to active zeolite is obtained by conversion to zeolite in a sodium hydroxide/potassium hydroxide or sodium hydroxide liquor.

6 Claims, No Drawings

METHOD FOR OBTAINING LSX ZEOLITE BODIES

FIELD OF INVENTION

1. Technical Field

The present invention relates to the production of faujasite agglomerates with a low silicon/aluminium ratio and with a low content of inert binder.

2. Background Art

Most zeolites are mainly synthesized by nucleation and crystallization of aluminosilicate gels, which results in a zeolite made of very small crystals. Powders are spoken of, in this respect. However, these powders are difficult to employ industrially and it is preferable to have a granular agglomerated form. These agglomerates, whether in the form of bars, balls of extrudates, are commonly composed of a zeolite powder, which constitutes the active component, and of a binder intended to provide for the cohesion of the crystals in the form of grains. This binder has no adsorbing property, its function being to give the grain sufficient mechanical strength to resist the vibrations and movements to which it is subjected during its various uses. These granules are prepared by forming a paste of the zeolite powder with a clayey paste, in proportions of the order of 80% of powder per 20% of binder, then shaping as balls, bars or extrudates, and heat treatment at high temperature to fire the clay and reactivate the zeolite.

This results in zeolitic bodies, with a particle size of a few millimetres, which, if the choice of the binder and the granulation are made according to the rules of the art, exhibit an array of satisfactory properties, in particular of porosity, of mechanical strength and of resistance to abrasion. The applicative properties are, obviously, reduced in the ratio of the active powder to the powder and its inert agglomeration binder.

Various means have been provided for overcoming this disadvantage of the binder of being inert with respect to the adsorbing performances, including the conversion of the binder, in all or part, into zeolite. This operation is easily carried out when use is made of binders of the kaolinite family calcined beforehand at temperatures of between 500° C. and 700° C. An alternative form consists in moulding kaolin grains and in converting them to zeolites: this principle is explained in "Zeolite Molecular Sieves" by D. W. Breck, John Wiley and Sons, New York. This technology has been applied with success to the production of grains of zeolite A or X composed up to 95% by weight of the zeolite itself and of an unconverted residual binder (see, to this end, Howell, U.S. Pat. No. 3,119,660), the addition of a silica source being recommended when it is desired to obtained a zeolite X ("Zeolite Molecular Sieves", Breck, p. 320).

Kuznicki and coworkers show, in U.S. Pat. No. 4,603,040, that it possible to convert a kaolin agglomerate into zeolite X with an Si/Al ratio equal to 1; nevertheless, the reaction, in order to be virtually complete, that is to say to result in the formation of a grain composed of approximately 95% zeolite X, requires approximately 10 days at 50° C., which makes the operation unfeasible industrially. If the reaction is carried out in combination with a maturing period of 5 days at 40° C., followed by crystallization at a higher temperature, the resulting solid is composed of 80% faujasite and 15% zeolite A.

JP-05163015 (Tosoh Corp.) teaches that it is possible to form grains of zeolite X with a low Si/Al ratio, of the order of 1, by mixing a zeolite X powder, with an Si/Al ratio equal to 1, with kaolin, potassium hydroxide, sodium hydroxide and carboxymethylcellulose. Shaping is carried out by extrusion. The grains thus obtained are dried, calcined at 600° C. for 2 hours and then immersed in a sodium hydroxide and potassium hydroxide solution at 40° C. for 2 days.

These two documents teach that it is possible to prepare mechanically strong solids mainly composed of zeolite X in which the Si/Al ratio is substantially lower than that of the zeolites X conventionally manufactured by the gel route, the Si/Al ratio of which is between 1.1, approximately, and 1.5. Nevertheless, the associated processes are inelegant and suffer either from an excessive reaction time or from the number of stages involved. It may be feared, moreover, that the heat treatment as claimed in JP 05-163015, after the shaping stage, does not contribute to the amorphization of the grain and that the object of the caustic digestion which follows is to recrystallize it, which would explain the slowness of the process.

DISCLOSURE OF INVENTION

In the present application, the designation LSX (Low Silica X) will be reserved for zeolites X with a low Si/Al ratio, namely zeolites X with an Si/Al ratio equal to 1, reasonable experimental deviations around this unit value being accepted, the lower values very definitely corresponding to inaccuracies in the measurement and the higher values corresponding to the presence of inevitable impurities with a higher silica content and containing sodium ions and possibly potassium ions. It is shown here that it is possible to prepare zeolitic bodies composed of at least 95% of zeolite having an Si/Al ratio equal to 1, by virtue of the use of a much simpler and faster process which consists in:

a) agglomerating a zeolite LSX powder with a binder containing at least 80% of a clay which can be converted to zeolite, b) shaping the mixture obtained in a), c) drying it and then calcining it at a temperature of 500–600° C., d) bringing the solid product resulting from c) into contact with a caustic aqueous solution, e) washing, drying and activating at a temperature of 500–600° C.

Conversion of the binder to zeolite takes place during the stage d) by the action of the caustic solution, which must be at least 0.5 molar and which can be a sodium hydroxide and potassium hydroxide solution in which the potassium hydroxide is present at a maximum content of 30 molar % (with respect to the combined sodium hydroxide+potassium hydroxide). It can be advantageous to use a sodium hydroxide solution. The process is carried out at a temperature sufficient to obtain a reasonable rate of conversion to zeolite.

The clay which can be converted to zeolite belongs to the kaolinite, halloysite, nacrite or dickite family. Kaolin is very simply used.

EXAMPLES

The following examples illustrate the invention.

Example 1

Preparation of a Faujasite LSX in the Presence of Potassium Hydroxide

A zeolite of faujasite LSX type, with an Si/Al ratio equal to 1, is synthesized by mixing the following solutions:

Solution A 136 grams of sodium hydroxide and 73 grams of potassium hydroxide (expressed on a pure basis) are dissolved in 280 grams of water. The solution is brought to boiling point between 100–115° C. and then 78 grams of alumina are dissolved. Once dissolution has been carried out, the solution is allowed to cool and is made up to 570 grams with water, in order to take into account the water evaporated.

Solution B 300 grams of water and 235.3 grams of sodium silicate (25.5 as $SiO_2$, 7.75% as $Na_2O$) are mixed with gentle stirring. The silicate solution is added to the aluminate solution over approximately 2 minutes with vigorous stirring by means of a deflocculating turbine mixer of Rayneri type rotating at 2500 revolutions/minute (peripheral speed= 3.7 m/s) and then the gel formed is left at 60° C. for 24 hours without stirring. After this period of time, significant separation by settling, characteristic of the crystallization process, is observed. Filtration is then carried out and then the residue is washed with approximately 15 ml of water per gram of solid. The latter is subsequently dried at 80° C. in an oven. The composition of the synthetic gel is:

$4Na_2O.1.3K_2O.1Al_2O_3.2SiO_2.91H_2O$

Chemical analysis of the solid resulting from the synthesis provides a composition:

$0.77Na_2O.0.23K_2O.2SiO_2.1Al_2O_3$

Analysis by X-ray diffraction confirms that the powder formed is composed of virtually pure faujasite, accompanied by traces of zeolite A, the content of which is estimated at less than 2%. Toluene adsorption capacity is measured after calcination at 550° C. for 2 hours under an inert atmosphere: an adsorbed capacity of 22.5% at 25° C. and under a partial pressure of 0.5 is found.

Example 2

Preparation of an Agglomerated LSX

Part of the powder is shaped by mixing 42.5 grams (expressed as calcined equivalent), 7.5 grams of a fibrous clay (expressed as calcined equivalent), 1 gram of carboxymethylcellulose and enough water to be able to extrude in the form of extrudates with a diameter of 1.6 mm and a length of approximately 4 mm. The extrudates are dried at 80° C. and are subsequently calcined at 550° C. for 2 hours under an inert atmosphere.

Example 3

Preparation of an Agglomerated LSX with a Low Level of Inert Binder According to the Invention The zeolite LSX powder of Example 1 is used by agglomerating it with a mixture of a clay of montmorillonite type (15%), of a clay of kaolin type (85%), of a small amount of carboxymethylcellulose and of water. After extrusion, drying is carried out at 80° C. and calcination is carried out at 600° C. for 2 hours under an inert atmosphere which does not contain water vapour.

A solution containing 16.7 grams of sodium hydroxide pellets and 7.7 grams of potassium hydroxide (expressed on a pure basis) in 100 ml of water is prepared. 10 grams of freshly calcined grains of zeolite are immersed in 17 ml of this solution and the whole mixture is brought to 95° C. without stirring.

Samples of solid are taken after 3, 6 and 24 hours, in order to monitor the change in the crystallinity as a function of time. Each of these samples is washed by immersion in water in the proportion of 20 ml/g; 4 washing operations are carried out.

Toluene adsorption capacity measurements are carried out under the conditions described above and the following values are found:

| | |
|---|---|
| Agglomerated LSX (NaOH + KOH untreated) | 18.2% |
| Agglomerated LSX (NaOH + KOH treated, reaction for 3 h) | 21.7% |
| Agglomerated LSX (NaOH + KOH treated, reaction for 6 h) | 21.6% |
| Agglomerated LSX (NaOH + KOH treated, reaction for 24 h) | 21.6% |

The X-ray diagrams show essentially the presence of faujasite, with some traces of zeolite A in an amount similar to that measured on the powder before agglomeration. Chemical analysis results in an overall Si/Al ratio of 1.04, corresponding to the desired objective. The Si/Al ratio, measured by silicon N.M.R., is equal to 1.01 and corresponds to the ratio of the crystal lattice.

It is thus demonstrated that it is possible to obtain LSX grains with a content of zeolite of faujasite type of at least 95%, on the basis of the adsorption capacities. At the same time, it is demonstrated that the reaction can be rapid (less than 3 hours), that it does not require a maturing period and that it does not require a large amount of a pore-forming agent, as claimed in U.S. Pat. No. 4,603,040.

Example 4

Preparation of an Agglomerated LSX with a Low Level of Inert Binder According to the Invention The zeolite LSX powder of Example 1 is used by agglomerating it with a mixture of a clay of montmorillonite type (15%), of a clay of kaolin type (85%), of a small amount of carboxymethylcellulose and of water. After extrusion, drying is carried out at 80° C. and calcination is carried out at 600° C. for 2 hours under an inert atmosphere which does not contain water vapour.

10 grams of these agglomerates are immersed in 17 ml of a 220 g/l sodium hydroxide solution for 3 hours at 95° C. The agglomerates are subsequently washed four times successively by immersion in water in the proportion of 20 ml/g.

Toluene adsorption capacity measurements are carried out under the conditions described above and the following values are found:

| | |
|---|---|
| Agglomerated LSX (untreated) | 18.2% |
| Agglomerated LSX (NaOH treated) | 22.4% |

The latter value is compared with that of the agglomerated LSX of Example 3

Agglomerated LSX (NaOH +KOH treated) 21.7%

These results express the high efficiency of the zeolitic bodies according to the invention and also reflect a better crystallinity of the LSX obtained by conversion to zeolite with sodium hydroxide. The silicon N.M.R. spectrum shows that the Si/Al ratio is equal to 1.01 in the crystal lattice. These zeolitic bodies with a toluene adsorption capacity greater than 21.5% at 25° C. are also subjects of the invention.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for the production of zeolitic bodies composed of at least 95% of zeolite LSX, wherein the process comprises the following operations:
    a) agglomerating a zeolite LSX powder with a binder containing at least 80% of a clay which can be converted to zeolite, to form a mixture,
    b) shaping the mixture obtained in operation a),
    c) drying and then calcining the shaped mixture obtained in operation b) at a temperature of 500° C. to 600° C. to form a solid product,
    d) bringing the solid product resulting from operation c) into contact with an at least 0.5 molar caustic aqueous solution, and
    e) further treating the solid product obtained in operation d) by washing, drying and activating at a temperature of 500–600° C.

2. The process according to claim 1, wherein the caustic solution is a sodium hydroxide and potassium hydroxide solution in which the potassium hydroxide is present at a maximum content of 30 molar % with respect to the combined sodium hydroxide and potassium hydroxide.

3. The process according to claim 1, wherein the caustic solution is a sodium hydroxide solution.

4. The process according to claim 1, wherein the binder which can be converted to zeolite belongs to the kaolinite, halloysite, nacrite or dickite family.

5. The process according to claim 1, wherein the binder which can be converted to zeolite is kaolin.

6. Zeolitic bodies composed of at least 95% of zeolite LSX, obtained according to the process of claim 1, with a toluene adsorption capacity at least equal to 21.5%.

* * * * *